(12) United States Patent
Frey et al.

(10) Patent No.: US 7,699,150 B2
(45) Date of Patent: Apr. 20, 2010

(54) HYDRODYNAMIC CLUTCH DEVICE

(75) Inventors: Peter Frey, Gerolzhofen (DE); Michael Heuler, Würzburg (DE); Edgar Reinhart, Hofheim (DE); Bernd Reinhardt, Schonungen (DE); Stefan Mundt, Würzburg (DE); Thomas Baier, Bergrheinfeld (DE); Frank Zerner, Bischberg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 342 days.

(21) Appl. No.: 11/711,289

(22) Filed: Feb. 27, 2007

(65) Prior Publication Data

US 2007/0205067 A1    Sep. 6, 2007

(30) Foreign Application Priority Data

Mar. 3, 2006    (DE) .................. 10 2006 009 987

(51) Int. Cl.
*F16H 45/02*    (2006.01)
*F16D 13/72*    (2006.01)

(52) U.S. Cl. .................. 192/3.3; 192/70.12; 192/70.17; 192/113.34; 192/213.2

(58) Field of Classification Search .................. None
See application file for complete search history.

(56) References Cited

U.S. PATENT DOCUMENTS

| 5,964,329 | A * | 10/1999 | Kawaguchi et al. | .......... 192/3.3 |
| 6,244,401 | B1 | 6/2001 | Maienschein et al. | |
| 6,799,665 | B1 * | 10/2004 | Sasse et al. | .................. 192/3.28 |
| 7,073,646 | B2 | 7/2006 | Sasse et al. | |
| 2002/0027053 | A1 | 3/2002 | Back et al. | |
| 2003/0221926 | A1 | 12/2003 | Arhab et al. | |
| 2004/0144607 | A1 * | 7/2004 | Back et al. | .................. 192/3.3 |
| 2005/0115788 | A1 * | 6/2005 | Ackermann et al. | ......... 192/3.29 |
| 2005/0211521 | A1 * | 9/2005 | Tomiyama | .................. 192/3.29 |

FOREIGN PATENT DOCUMENTS

| DE | 197 22 151 | 12/1997 |
| DE | 101 17 746 | 11/2001 |
| DE | 103 19 415 | 12/2003 |
| DE | 10 2004 029 157 | 12/2005 |
| JP | 2001-116110 | 4/2001 |

OTHER PUBLICATIONS

Search Report dated Aug. 7, 2007 for the corresponding European Patent Application No. EP 07 00 3269.

\* cited by examiner

*Primary Examiner*—Richard M. Lorence
(74) *Attorney, Agent, or Firm*—Cohen Pontani Lieberman & Pavane LLP

(57) ABSTRACT

A hydrodynamic clutch includes a housing which can be brought into working connection with a drive; a hydrodynamic circuit formed by a pump wheel and a turbine wheel; a torsional vibration damper having a drive side transmission element, a takeoff side transmission element, and at least one energy storage group between the transmission elements; and a bridging clutch including first friction elements connected to the housing and second friction elements connected to the drive side transmission element. A first flow route extends from a first flow passage to the friction elements, and a second flow route extends from the hydrodynamic circuit to a second flow passage. A sealing arrangement cooperates with the drive side transmission element to separate the first flow route from the second flow route.

14 Claims, 5 Drawing Sheets

US 7,699,150 B2

HYDRODYNAMIC CLUTCH DEVICE

BACKGROUND OF THE INVENTION

1. Field of the Invention

The invention pertains to a hydrodynamic clutch device including a housing which can be brought into working connection with a drive; a hydrodynamic circuit formed by a pump wheel and a turbine wheel; a torsional vibration damper having a drive side transmission element, a takeoff side transmission element, and at least one energy storage group between the transmission elements; and a bridging clutch connecting the housing to the drive side transmission element of the torsional vibration damper.

2. Description of the Related Art

A hydrodynamic clutch device of this type is known from, for example, DE 10 2004 029 157 A1. The hydrodynamic clutch arrangement has a hydrodynamic circuit, formed by a pump wheel, a turbine wheel, and a stator, and is realized as a torque converter, which is designed with a bridging clutch, the piston of which is able to move a plurality of friction elements into and out of engagement with each other. First friction elements are mounted nonrotatably on a housing of the hydrodynamic clutch device, so that this housing, which is connected for rotation in common with a drive, such as the crankshaft of an internal combustion engine, acts as a drive-side friction element carrier. Second friction elements are mounted nonrotatably on a drive-side transmission element of a torsional vibration damper, which thus acts as a takeoff-side friction element carrier. The bridging clutch has friction surfaces located between adjacent friction element carriers. The drive-side transmission element of the torsional vibration damper cooperates with an energy-storage group and a takeoff-side transmission element of the torsional vibration damper to form a damping device, which is connected nonrotatably to a takeoff such as a gearbox input shaft. The energy-storage group is supported in openings in cover plates, which are connected nonrotatably to the takeoff-side friction element carrier, and is also supported in openings provided in the takeoff-side transmission element.

In the known hydrodynamic clutch device, the openings for the energy-storage group in the cover plates and in the takeoff-side transmission element are permeable to the fluid medium present in the housing. Because of these openings, there is the problem that a not inconsiderable portion of the fluid medium moving from a flow inlet to a flow outlet flows through the openings, thus bypassing the friction surfaces of the bridging clutch. Especially during phases in which the friction elements are heated because of slippage, it is possible that this phenomenon can cause a deficiency of cooling fluid medium in the area of the friction surfaces, so that the heat developed at the friction surfaces cannot be carried away. As a result, the load capacity of these friction elements becomes lower than that of better-cooled friction elements.

This basic problem of the openings for the energy-storage group is especially relevant when the known hydrodynamic clutch device is designed as a three-line system. In a three-line system, a pressure space located axially between the drive-side cover of the clutch device and a piston of the bridging clutch is not only sealed off against the hydrodynamic circuit, but also connected to an additional pressure line of a hydraulic system, which means that the hydrodynamic circuit has both a flow inlet and a flow outlet.

A two-line system such as that known from U.S. Pat. No. 7,073,646 is therefore superior with respect to the dissipation of heat from the area of the friction surfaces. In a two-line system, the pressure space located between the drive-side cover of the clutch device and the piston of the bridging clutch is connected to a control line of a hydraulic system, which acts either as a flow inlet or as a flow outlet for fluid medium in correspondence with the operating state of the clutch device at the moment in question, i.e., depending on whether the bridging clutch is open or closed. Because otherwise there is only one other flow inlet or outlet for the hydrodynamic circuit, the fluid medium is forced, as it enters the hydrodynamic circuit or leaves it, to flow across the friction surfaces of the bridging clutch, because the bridging clutch in a two-line system acts as a separation point between the hydrodynamic circuit and the pressure space. For this reason, the use of a torsional vibration damper in a two-line system such as that according to U.S. Pat. No. 7,073,646 does not present a problem, even though this damper has two radially offset damping devices, in which openings which allow the flow of the fluid medium are provided in the cover plates and hub disks to accommodate the drive-side energy-storage group of the drive-side damping device and the takeoff-side energy-storage group of the takeoff-side side damping device. The two energy-storage groups are connected to each other by an intermediate transmission element.

To return to the hydrodynamic clutch devices with the more problematic three-line system: FIG. 1 of U.S. Pat. No. 6,244,401 shows a design in which a clutch device operating according to this system cooperates with a torsional vibration damper with two damping devices, each with openings which promote the flow of the medium. Because this design is especially critical with respect to the overheating of the friction elements of the bridging clutch as explained above, FIG. 2 of the '401 patent shows a torsional vibration damper in which a closed cover plate is assigned to the radially outer damping device. A cover plate of this type, however, takes up more space in the axial direction than a cover plate with openings for the energy-storage group, and this extra space is located precisely in the area of the torsional vibration damper where it has already been made larger in the axial direction because of the presence of an energy-storage group. Presumably for this reason, the torsional vibration damper according to the '401 patent does not have a closed cover plate for the radially inner damping device.

SUMMARY OF THE INVENTION

The invention is based on the task of designing a hydrodynamic clutch device with a bridging clutch and with a torsional vibration damper in such a way that, regardless of the design of the line system in the clutch device and regardless of the number of damping devices of the torsional vibration damper, it is possible to ensure that there will always be a sufficient flow of cooling fluid medium around the friction surfaces of the bridging clutch.

According to the invention, at least one sealing arrangement is assigned to the minimum of one damping device of the torsional vibration damper of the hydrodynamic clutch device, which can be, for example, either a hydrodynamic torque converter or a hydro clutch. This sealing arrangement extends at least over the area of at least one energy-storage group in order to separate a first flow route for fluid medium between at least one first flow passage for a housing of the hydrodynamic clutch device and a friction area between friction elements of a bridging clutch of the hydrodynamic clutch device, from a second flow route for fluid medium between at least one second flow passage for the housing and the hydrodynamic circuit of the hydrodynamic clutch device, for at least most of the fluid medium flowing by way of the two flow routes. As a result, the fluid medium coming from the flow passage serving as the flow inlet is guided almost in its entirety by forced flow to the friction elements of the bridging clutch and thus to the friction surfaces, while at least most of the fluid medium is effectively prevented from escaping via the openings in the transmission elements of the torsional vibration damper such as the cover plates or hub disks. It is preferable to use, as the flow inlet, the flow passage in which, with respect to the flow direction, the friction elements are upstream of the hydrodynamic circuit, so that freshly introduced fluid medium first arrives at the friction elements to cool the friction surfaces and arrives in the hydrodynamic circuit only after flowing through the bridging clutch. The fluid medium can then be carried away via the flow passage serving as the flow outlet. When the flow is guided in this way, the best possible cooling effect can be provided for the friction elements of the bridging clutch as a result of the continuous arrival of fresh fluid medium. If the flow directions were reversed, the fluid medium would arrive first in the hydrodynamic circuit and would already be hot by the time it reached the friction elements of the bridging clutch. Guiding the flow in this way would be an effective choice precisely in cases where the hydrodynamic clutch device is designed as a 3-line system, in which the inflow and outflow needs of the hydrodynamic circuit with respect to the fluid medium can be served independently of the actuation of the piston of the bridging clutch and thus, in contrast to the situation with 2-line hydrodynamic clutch device, the flow fluid medium is not forced over the friction elements.

When the hydrodynamic clutch device is realized as a 3-line system, it is advantageous to bring at least two different friction elements into working connection with each other, the first friction elements being connected for rotation in common to the housing of the clutch device, which acts as the drive-side friction element carrier, and therefore to a drive such as the crankshaft of an internal combustion engine, whereas the second friction elements are connected to a drive-side transmission element of the torsional vibration damper, which acts as a takeoff-side friction element carrier. There is always a common friction surface between two different friction elements; and as the relative movement of the friction elements with respect to each other increases, that is, as the slippage of the clutch increases, this common friction surface can undergo an increasing amount of heat build-up. When the friction elements are designed as plates, the bridging clutch then has a stack of plates, and the friction element carriers act as plate carriers.

The sealing arrangement extending over the associated energy-storage group as claimed is preferably located on a transmission element of the torsional vibration damper which is free to move with respect to the takeoff-side friction element carrier. In the case of a torsional vibration damper with only one damping device and thus only one energy-storage group, this transmission element with freedom of movement relative to the takeoff-side friction element carrier would be formed by the takeoff-side transmission element of the torsional vibration damper. In the case of a torsional vibration damper with at least two damping devices and therefore at least two energy-storage groups, however, the movable transmission element in question would be formed by an intermediate transmission element, which connects the two energy-storage groups to each other and which can have a plurality of cover plates, each of which can be designed with openings to hold the assigned energy-storage group. This intermediate transmission element preferably acts as an output transmission element for the drive-side energy-storage group and conversely as an input transmission element for the takeoff-side energy-storage group.

Regardless of whether the sealing arrangement is mounted on the takeoff-side transmission element of a torsional vibration damper or on its intermediate transmission element, the transmission element has a certain freedom of movement with respect to the drive-side transmission element. So that it will not be necessary to allow for wear or friction between the sealing arrangement and the associated transmission element in spite of this freedom of relative movement, it is advantageous for the sealing arrangement merely to approach the drive-side transmission element very closely and thus for the two components not actually to touch each other. If an area of the sealing arrangement located a certain distance away from the attachment point of the sealing arrangement to the takeoff-side transmission element or to the intermediate transmission element is allowed to approach the drive-side transmission element of the torsional vibration damper so closely that only a small gap remains between this area and the drive-side transmission element, then a gap seal is created for the fluid medium. This seal allows only a negligible quantity of fluid medium to pass through and thus ensures that almost all of the fluid medium bypasses the gap seal and arrives at the friction elements of the bridging clutch. It is irrelevant here whether the area facing away from the attachment point of the sealing arrangement forms a gap seal extending at least essentially in the axial direction or a gap seal extending at least essentially in the radial direction. The two differently aligned gap seals will essentially be oriented in the radial or axial direction on the basis of the space available in the torsional vibration damper. Alternatively, however, a contact seal can also be used, by means of which a seal even better than that of a gap seal can be obtained.

As previously described, the takeoff-side friction element carrier, which preferably acts as a drive-side transmission element, is in effective working connection with the sealing arrangement. This friction element carrier preferably has flow passages for the supplied fluid medium, so that this medium can arrive via the shortest possible route at the friction elements, especially the friction surfaces acting between the friction elements. It is especially advantageous for the flow passages to be provided in the takeoff-side friction element carrier in such a way that flowing fluid medium is aimed directly at the friction surfaces between adjacent friction elements. When the gap seal is designed with an axial orientation or when a contact seal is used with an axial effect, the takeoff-side friction element carrier can be provided both with a set of teeth and with a set of notches, so that it can carry the corresponding friction elements along in rotation, provided that the gap seal or the contact seal is located on the side of the friction element carrier free of teeth or notches. In contrast, when the gap seal is designed with a radial orientation or when a contact seal with a radial effect is used, it is preferable to use a takeoff-side friction element carrier with notches, because this will advantageously have an unprofiled approach surface on the side facing the seal. This smooth surface allows the seal to approach the corresponding radial side of the friction element carrier close enough to guarantee the required sealing action.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
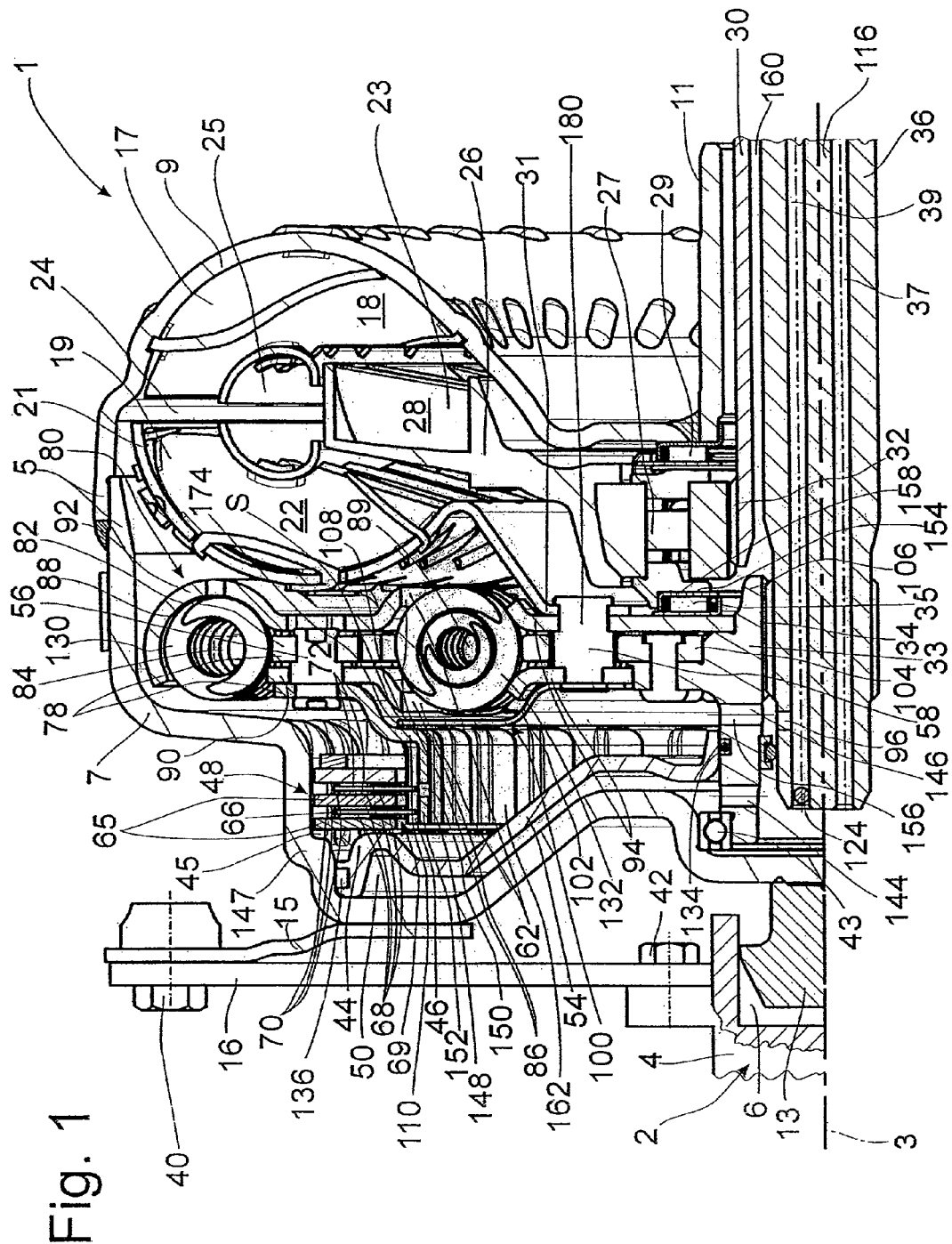
FIG. 1 shows the upper half of a longitudinal cross section through a hydrodynamic clutch arrangement with a bridging clutch and a torsional vibration damper with two energy-storage groups, where a sealing arrangement with an axial gap seal against a drive-side transmission element of the torsional vibration damper is assigned to the takeoff-side energy-storage group.

FIG. 1 shows a hydrodynamic clutch device 1 in the form of a hydrodynamic torque converter, which is able to execute rotational movement around an axis of rotation 3. The hydrodynamic clutch device 1 has a clutch housing 5, which has a housing cover 7 on the side facing a drive 2, such as the crankshaft 4 of an internal combustion engine. The housing cover 7 is permanently connected to a pump wheel shell 9. This shell merges in the radially inner area with a pump wheel hub 11.

To return to the housing cover 7: In its radially inner area, this cover has a bearing journal 13, which is mounted in the conventional manner in a recess 6 in the crankshaft 4 for the drive-side centering of the clutch housing 5. The housing cover 7 also has a mounting element 15, which allows the clutch housing 5 to be attached to the drive 2, namely, by way of a flexplate 16. This flexplate is attached by fastening elements 40 to the mounting element 15 and by fastening elements 42 to the crankshaft 4.

The previously mentioned pump wheel shell 9 cooperates with pump wheel vanes 18 to form a pump wheel 17, which works together with a turbine wheel 19 comprising a turbine wheel shell 21 and turbine wheel vanes 22 and with a stator 23 equipped with stator vanes 28. The pump wheel 17, the turbine wheel 19, and the stator 23 form a hydrodynamic circuit 24, which encloses an internal torus 25 in the conventional manner.

The stator vanes 28 of the stator 23 are mounted on a stator hub 26, which is mounted on a freewheel 27. The freewheel 27 is supported axially by an axial bearing 29, permeable to fluid medium, against the pump wheel hub 11 and is connected by a set of teeth 32 nonrotatably but with freedom of axial movement to a support shaft 30, located radially inside the pump wheel hub 11. The support shaft 30, which is designed as a hollow shaft, for its own part encloses a gearbox input shaft 36, thus forming an essentially ring-shaped channel 160. The gearbox input shaft serves as the takeoff 116 of the hydrodynamic clutch device 1 and has two axial passages 37, 39, offset radially from each other, for the fluid medium. The gearbox input shaft 36 has a set of teeth 34, on which a torsional vibration damper hub 33 of the torsional vibration damper 80 is mounted nonrotatably with freedom of axial movement, where this torsional vibration damper hub 33 serves to hold a turbine wheel base 31 with freedom of rotational movement. The torsional vibration damper hub 33 is supported on one side by an axial bearing 35 against the previously mentioned freewheel 27, and on the other side it is supported by a support bearing 43 against the housing cover 7. The torsional vibration damper hub 33 also carries a piston 54 of a bridging clutch 48, the piston being sealed off against the torsional vibration damper hub 33 by a radially inner piston seal 134 and against the housing cover 7 by a radially outer piston seal 136.

Figure 2:
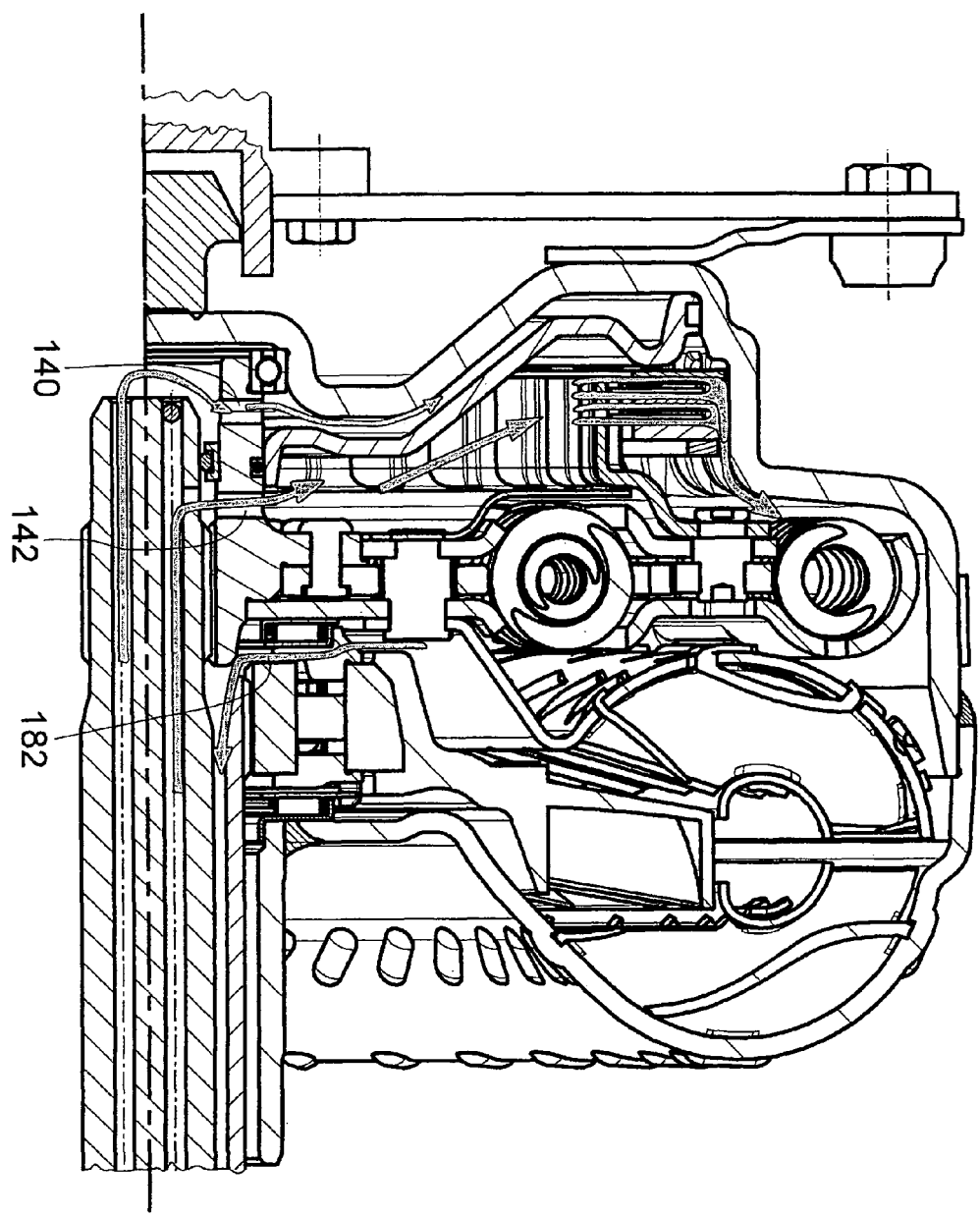
FIG. 2 is similar to FIG. 1 except that it shows the routes taken by the medium.

Fluid medium which has entered through the first axial bore 37 of the gearbox input shaft 36 (FIG. 2) exits at the drive-side end of the gearbox input shaft 36 and is deflected by the housing cover 7 essentially in the radial direction. It thus flows through a flow passage 144, which defines a flow route 140, and enters the pressure chamber 50, located axially between the housing cover 7 and the piston 54 of the bridging clutch 48. The side of the piston 54 facing away from the pressure chamber 50 faces another pressure chamber 162 (the clutch chamber) and can move axially between two different limit positions to engage or disengage the bridging clutch 48 as a function of the pressure relationships in the additional pressure chamber 162 and in the pressure chamber 50.

The side of a radially outer pressure area 44 of the piston 54 facing the torsional vibration damper 80 acts on a first friction element 65 in the form of a radially outer plate, which for its own part is supported against a second friction element 66 in the form of a radially inner plate. Additional first and second friction elements 65, 66 follow along in sequence, where preferably the second friction elements 66 have friction linings 68 on their axial sides, whereas preferably the first friction elements 65 have friction surfaces 70 for contact with the friction linings 68 of the second friction elements 66. The friction elements 65, 66 together form in common the friction area 69 of the bridging clutch 48.

The first friction elements 65 are connected nonrotatably by a set of teeth 45 to the housing 5, which serves as a drive-side friction element carrier 147, whereas the second friction elements 66 are connected nonrotatably by a set of teeth 46 to a takeoff-side friction element carrier 148. The takeoff-side friction element carrier 148 is connected nonrotatably by rivets 56 to a radially outer hub disk 82 of the torsional vibration damper 80 and thus serves jointly with the radially outer hub disk 82 as the drive-side transmission element 78 of the torsional vibration damper 80.

The drive-side transmission element 78 has areas extending essentially in the radial direction, which act as drive elements 84 for a first energy-storage group 130, referred to in the following as the drive-side energy-storage group 130. The drive-side energy-storage group 130 extends essentially in the circumferential direction and is supported at the other end against drive elements 88 of a drive-side cover plate 90 and of a takeoff-side cover plate 92, connected nonrotatably to the drive-side plate, where the takeoff-side plate encompasses the drive-side energy-storage group 130 around part of its circumference. The nonrotatable connection between the two cover plates 90 and 92, which serve jointly as the intermediate transmission element 94 of the torsional vibration damper 80, is accomplished by a pin-and-socket connection 58, which also connects a sealing plate 102, which serves as the sealing arrangement 100, the function of which will be explained again further below, on the drive side and the turbine wheel base 31 nonrotatably to the cover plates 90, 92.

The cover plates 90, 92 acting as the intermediate transmission element 94 are provided with openings 62 in the form of spring windows radially outside the pin-and-socket connection 58. These windows accommodate a second energy-storage group 132, which is referred to below as the takeoff-side energy-storage group 132, where the boundaries of the openings 62 at the circumferential ends act as drive elements 86 for the takeoff-side energy-storage group 132, which is supported at the other end against drive elements 89 of the hub disk 104. The hub disk 104 works together with the torsional vibration damper hub 33 to form a takeoff-side transmission element 106 of the torsional vibration damper 80.

To cover the openings 62 for the second energy-storage group 132 against the bridging clutch 48, the sealing plate 102, starting from the pin-and-socket connection 58 serving as the attachment point 180 for the sealing plate 102, extends radially outward to a radially outer area 108 which overlaps in this direction to an essentially radially oriented section 110 of the takeoff-side friction element carrier 148. The radially outer area 108 of the sealing plate 102 approaches the radial section 110 of the takeoff-side friction element carrier 148 in the axial direction until it forms a small gap. As a result, an axial gap seal 174 is produced.

At the end facing the drive 2, the previously mentioned axial bore 39 of the gearbox input shaft 36 terminates at a plug 124. This forces the fluid medium being supplied through the axial bore 39 to exit through a radial opening 96 in the gearbox input shaft 36 (FIG. 2), and from there the fluid medium flows in the radially outward direction through a first flow passage 146, which defines a first flow route 142, into the clutch chamber 162. The first flow passage 146 serves as a flow inlet 156 and simultaneously ensures that the pressure is built up in the clutch chamber 162.

After passing through the clutch chamber 162, the fluid medium arrives at flow passages 150, which are provided in an essentially axial section 152 of the takeoff-side friction element carrier 148. These passages are essentially aligned radially with the associated friction surfaces 70 of the friction area 69 of the bridging clutch 48. As a result, the friction areas 69 are efficiently cooled, especially when the friction linings 68 of the second friction elements 66 are provided with grooves 72. Alternatively or in addition, the friction surfaces 70 of the first friction elements 65 can also be provided with grooves for the flow of fluid medium.

After it has passed the friction area 69 of the bridging clutch 48, the fluid medium arrives at the hydrodynamic circuit 24 and thus supplies it. There, the fluid medium is deflected radially inward along a second flow route 182 (FIG. 2) toward the axial bearing 35, which has a second flow passage 154. This second flow passage 154 serves as a flow outlet 158 for the fluid medium from the hydrodynamic circuit 24. The fluid medium leaves the clutch housing 5 via the channel 160.

The function of the sealing plate 102 is to prevent fluid medium from leaving the clutch chamber 162 and entering the hydrodynamic circuit 24, especially via the openings 62 for the second energy-storage group 132. In this way, nearly the entire inflow of fluid medium via the flow passages 150 of the takeoff-side friction element carrier 148 is conducted to the friction surfaces 70 of the friction area 69 of the bridging clutch 48, where it can take up the heat which has been generated there by friction, before the fluid medium is supplied to the hydrodynamic circuit 24. The cooling action on the bridging clutch 48 is correspondingly high, and thus a large amount of torque can be transmitted by the clutch. As a result of the approach of the radially outer end 108 of the sealing plate 102 until only a gap S remains, there is no friction-promoting contact between the sealing plate 102, which is connected nonrotatably to the intermediate transmission element 94, and the takeoff-side friction element carrier 148, which acts as the drive-side transmission element 78 and which thus is able to rotate relative to the intermediate transmission element 94. As a result, wear-induced damage to the torsional vibration damper 80 is avoided without any restriction on the quality with which vibrations are isolated.

Because the radially outer area 108 of the sealing plate 102 approaches the takeoff-side friction element carrier 148 in the axial direction, its shape does not cause any interference in the area of the teeth 46.

Figure 3:
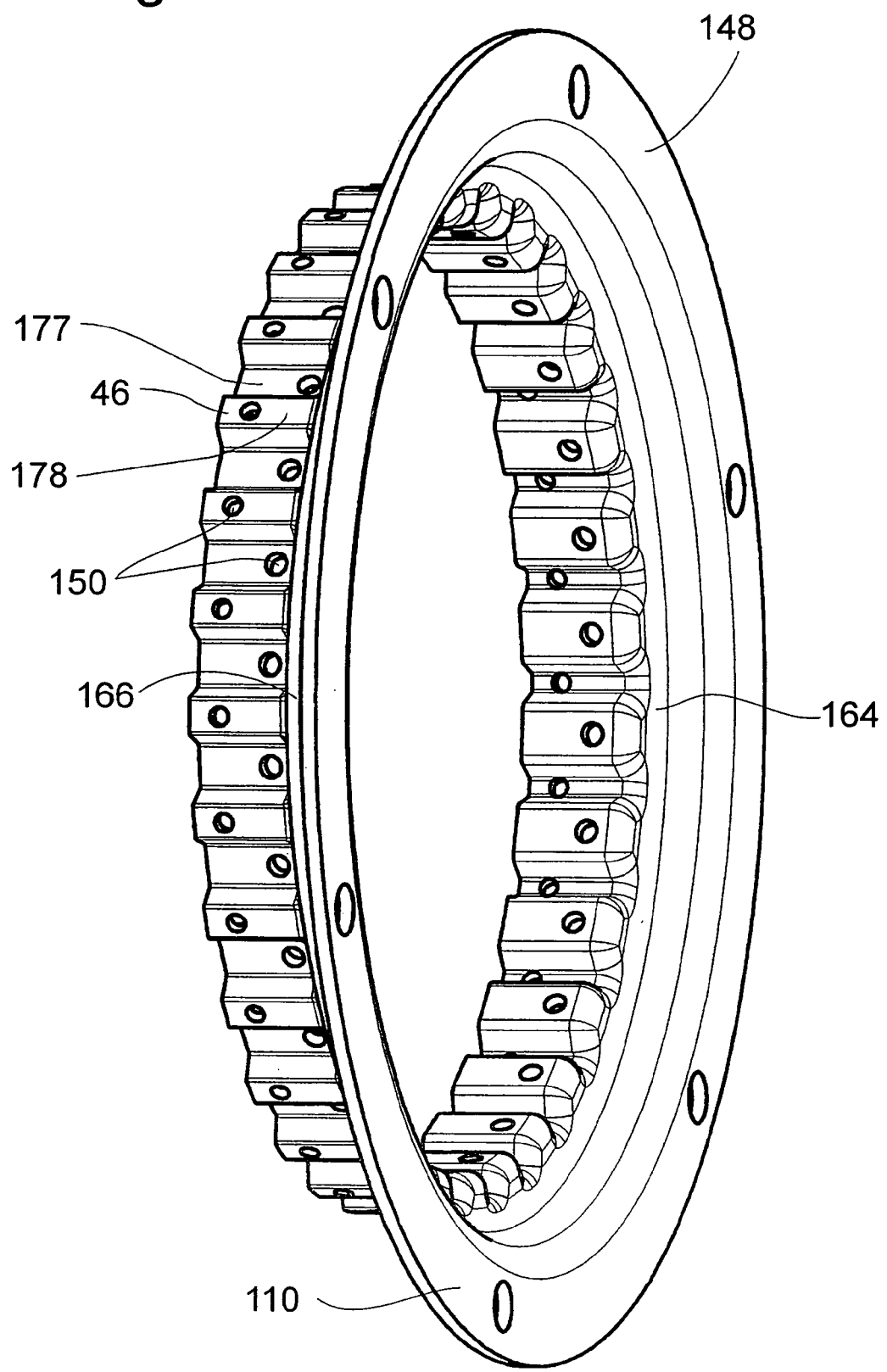
FIG. 3 shows a detailed view, in isolation, of a takeoff-side friction element carrier of the bridging clutch, the carrier being assigned to the drive-side transmission element of the torsional vibration damper shown in FIG. 1, except that, in contrast to the embodiment in FIG. 1, the carrier has a collar between a radial area and a set of teeth which are free of interruption in the circumferential direction.
Figure 4:
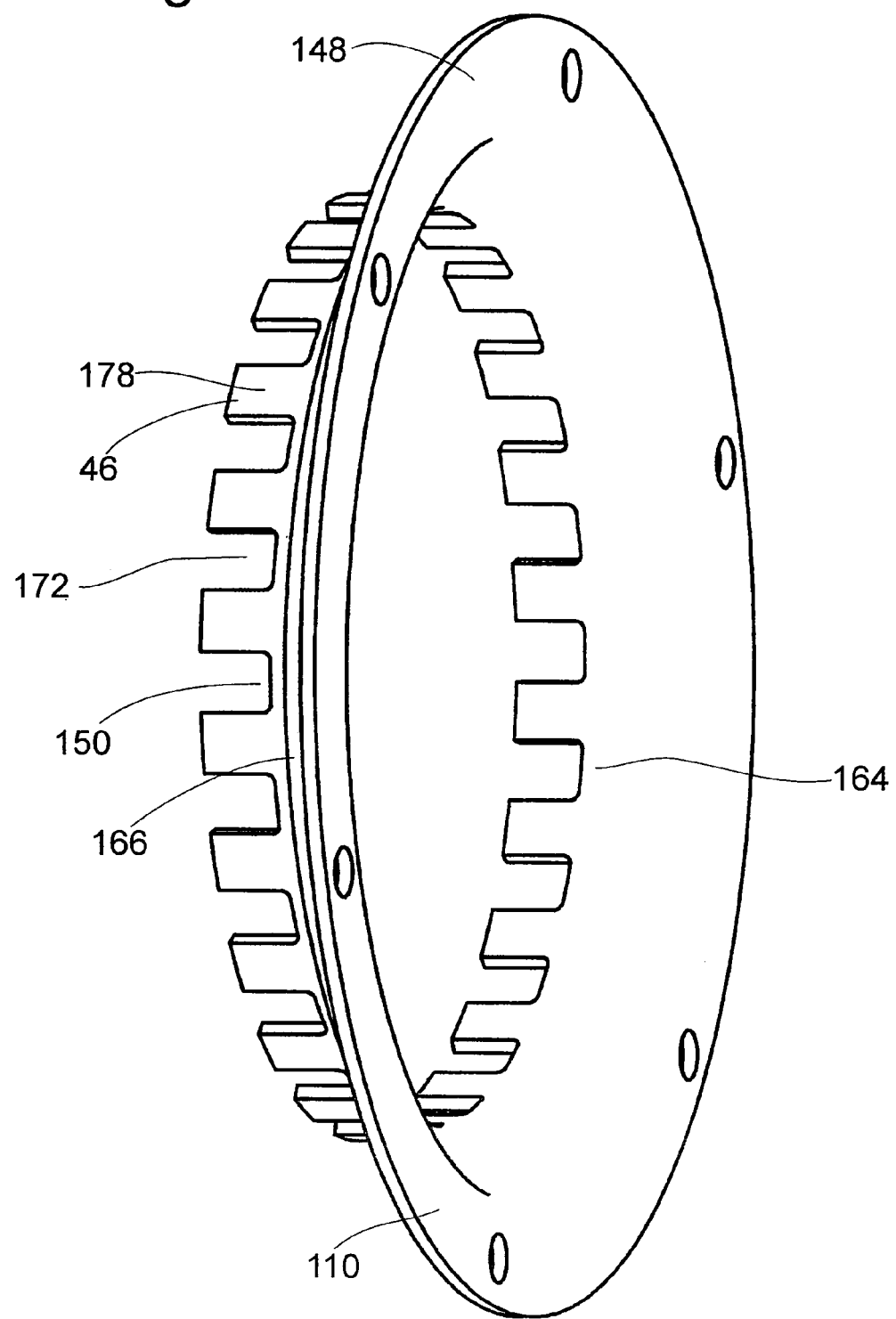
FIG. 4 is similar to FIG. 3 except that it shows a set of teeth formed in the circumferential direction by notches.
Figure 5:
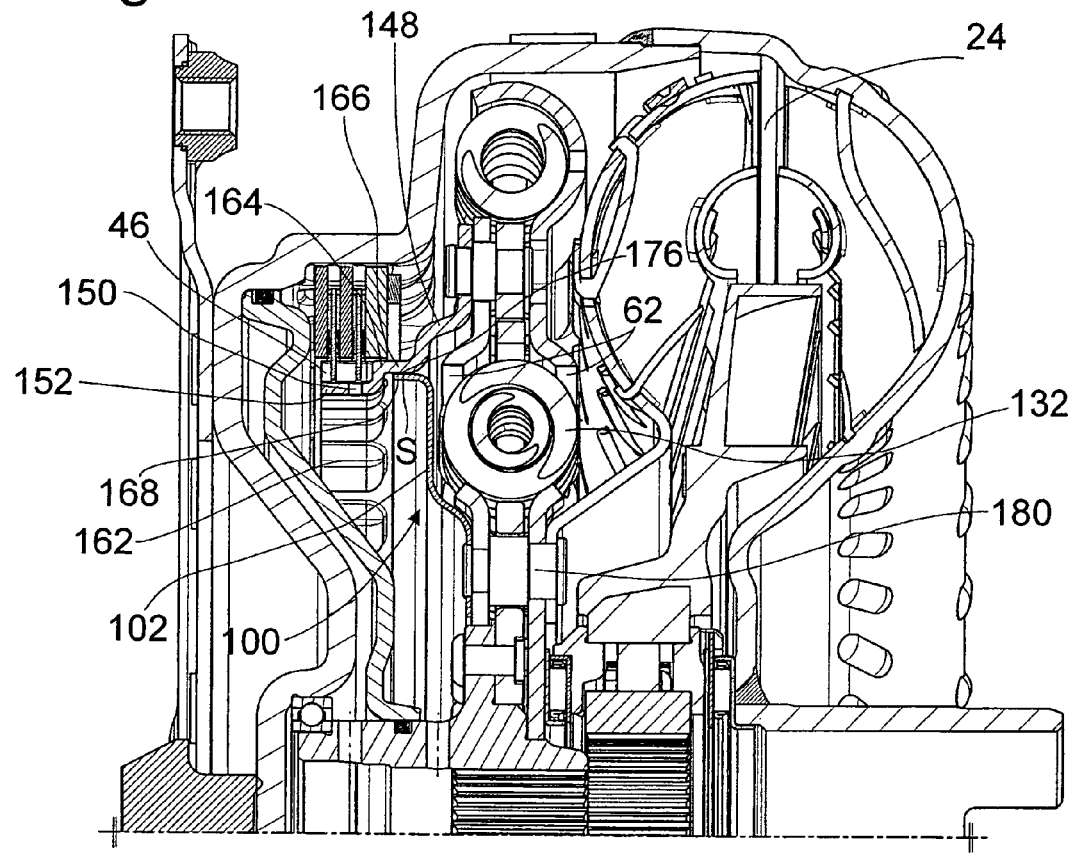
FIG. 5 is similar to FIG. 1, except that it shows a radial gap seal against the drive-side transmission element of the torsional vibration damper.

In contrast to the takeoff-side friction element carrier 148 shown in FIG. 1 with a set of teeth 46 which extends essentially over the entire distance available in the axial direction, the friction element carrier according to FIGS. 3-6 has a ring-shaped collar 164 axially adjacent to the at least the essentially radially oriented section 110. This collar forms a radial approach surface 166 for the sealing plate 102 of the sealing arrangement 100, which, as FIG. 5 shows, has an axially outer area 168, which extends essentially in the axial direction and is brought up radially toward the axially oriented approach surface 166 of the ring-shaped collar 164 to within a gap distance S, thus forming a radial gap seal 176. In this design as well, fluid medium which has entered the clutch chamber 162 is conducted directly to the flow passages 150 in the axial section 152 of the takeoff-side friction element carrier 148 without any essential portion of the fluid medium being able to escape via the openings 62 for the second energy-storage group 132 into the hydrodynamic circuit 24.

A difference between the diagrams of FIGS. 3 and 4 pertains to the design of the set of teeth 46 on the takeoff-side friction element carrier 148.

The takeoff-side friction element carrier 148 shown in FIG. 3 has a set of teeth 46 which is free of interruptions in the circumferential direction. The teeth 178 alternate here with radial depressions 177. Because of the absence of interruptions in the set of teeth 46 in the circumferential direction, the set of teeth 46 is provided with flow passages 150 in the form of radial bores. A set of teeth 46 of this type is preferably produced by a deep-drawing process.

The takeoff-side friction element conductor 148 shown in FIG. 4 has notches 172 between the teeth 178; the notches mean that there are interruptions between the teeth 46. The main function of the notches 172 is to engage with radial projections (not shown) on the second friction elements 66; a secondary function is to serve as flow passages 150 for the fluid medium.

Figure 6:
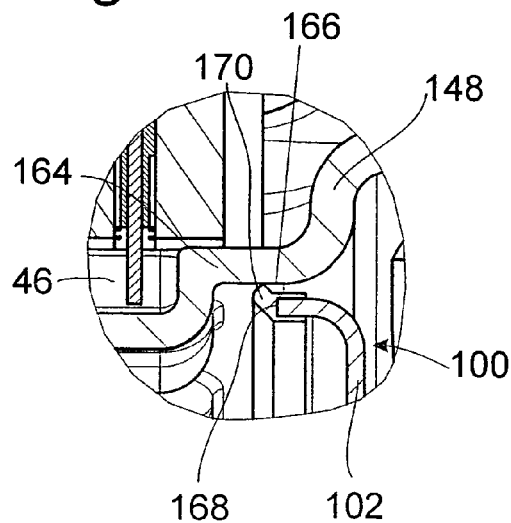
FIG. 6 is similar to FIG. 5, except that it shows a radial contact seal against the drive-side transmission element of the torsional vibration damper.
Figure 7:
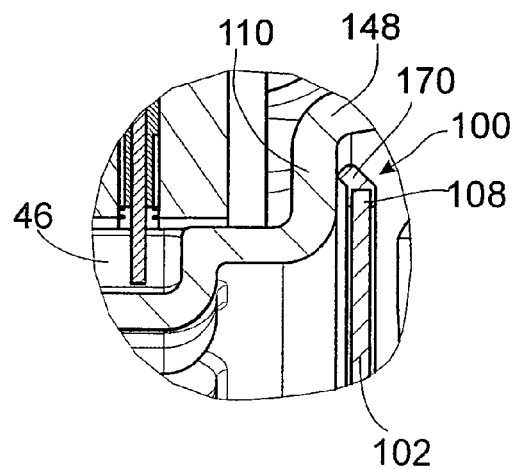
FIG. 7 is similar to FIG. 6, except that it shows an axial contact seal against the drive-side transmission element of the torsional vibration damper.

As FIG. 6 shows, the axially outer area 168 of the sealing plate 102 of the sealing arrangement 100 can be covered by a contact sealing element 170, preferably by an elastomeric sealing element, which makes physical contact with the axially oriented approach surface 166 of the ring-shaped collar 164. Of course, as FIG. 7 shows, a contact sealing element 170 can also be used in the design shown in FIG. 1, in that this element is attached to the radially outer area 108 of the sealing plate 102 and makes physical contact with the radially oriented section 110 of the takeoff-side friction element carrier 148.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A hydrodynamic clutch device comprising:
   a housing which can be brought into working connection with a drive;
   a hydrodynamic circuit formed by a pump wheel and a turbine wheel in said housing;
   a bridging clutch comprising a friction area in said housing;
   a torsional vibration damper comprising a drive side transmission element, a takeoff side transmission element, and at least one energy storage group between said transmission elements;
   a first flow route for a fluid medium extending from a first flow passage to said friction area;
   a second flow route for said fluid medium extending from said hydrodynamic circuit to a second flow passage; and
   a sealing arrangement separating said first flow route from said second flow route,
   wherein the torsional vibration damper comprises a transmission element which can move relative to the drive side transmission element, the sealing arrangement being fixed to the transmission element which can move relative to the drive side transmission element and cooperating with the drive side transmission element to separate the first flow route from the second flow route, and
   wherein the sealing arrangement comprises a radially outer area which is separated from the drive side transmission element by a sealing gap.

2. The hydrodynamic clutch device of claim 1 wherein said bridging clutch comprises a plurality of first friction elements connected to said housing and fixed against rotation with respect to said housing, and a plurality of second friction elements connected to said drive side transmission element and fixed against rotation with respect to said drive side transmission element.

3. The hydrodynamic clutch device of claim 2 further wherein said drive side transmission element of said torsional vibration damper is formed with teeth which engage said second friction elements to prevent rotation while permitting axial movement.

4. The hydrodynamic clutch device of claim 3 wherein said teeth alternate with radial depressions, each adjacent pair of said teeth being connected to each other by a depression.

5. The hydrodynamic clutch device of claim 4 wherein each said tooth is formed with a flow passage which conducts fluid medium from said first flow route to said friction area.

6. The hydrodynamic clutch device of claim 3 wherein said teeth alternate with notches, each adjacent pair of said teeth being separated by a notch, said notches serving as flow passages which conduct fluid medium from said first flow route to said friction area.

7. The hydrodynamic clutch device of claim 1 wherein said radially outer area approaches a radially oriented surface of said drive side transmission element axially to form an axial sealing gap.

8. The hydrodynamic clutch device of claim 1 wherein said radially outer area approaches an axially oriented surface of said drive side transmission element to form a radial sealing gap.

9. The hydrodynamic clutch device of claim 1 further comprising a contact sealing element in said gap.

10. The hydrodynamic clutch device of claim 1 wherein said first flow passage acts as a flow inlet for said fluid medium, and said second flow passage acts as a flow outlet for said fluid medium.

11. The hydrodynamic clutch device of claim 10 wherein said first flow path is connected to said second flow path via said friction area, whereby said fluid medium flows from said inlet to said friction area to said hydrodynamic circuit to said outlet.

12. The hydrodynamic clutch device of claim 1 where said drive side transmission element is formed with flow passages which conduct fluid medium from said first flow route to said friction area.

13. The hydrodynamic clutch device of claim 12 wherein said bridging clutch comprises a plurality of friction elements having friction surfaces in said friction area, said flow passages formed in said drive side transmission element directing said fluid medium toward the friction surfaces.

14. A hydrodynamic clutch device comprising:
   a housing which can be brought into working connection with a drive;
   a hydrodynamic circuit formed by a pump wheel and a turbine wheel in said housing;
   a bridging clutch comprising a friction area in said housing;
   a torsional vibration damper comprising a drive side transmission element, a takeoff side transmission element, and at least one energy storage group between said transmission elements;
   a first flow route for a fluid medium extending from a first flow passage to said friction area;
   a second flow route for said fluid medium extending from said hydrodynamic circuit to a second flow passage; and
   a sealing arrangement separating said first flow route from said second flow route,
   wherein the torsional vibration damper comprises an intermediate transmission element which can move relative to the drive side transmission element, the sealing arrangement being fixed to the intermediate transmission element; and cooperating with the drive side transmission element to separate the first flow route from the second flow route, and
   wherein the at least one energy storage group comprises a drive side energy storage group operatively connected to the drive side transmission element, and a takeoff side energy storage group operatively connected to the takeoff side transmission element, said intermediate transmission element connecting said first and second energy storage groups.

* * * * *